(12) United States Patent
Matuchniak et al.

(10) Patent No.: US 11,382,171 B2
(45) Date of Patent: Jul. 5, 2022

(54) ASSIGNMENT AND UPDATING OF GEO-COORDINATES FOR HARDWARE WITH KNOWN LOCATIONS IN ACCESS CONTROL, OPERATIONS, AND NODE VALIDATION IN ORGANIZATIONAL COMMUNICATIONS AND RISK MANAGEMENT SYSTEMS

(71) Applicant: SOS SOFTWARE, INC., Yorba Linda, CA (US)

(72) Inventors: Tadeusz Peter Matuchniak, Irvine, CA (US); Kevin C. Daly, Newport Beach, CA (US)

(73) Assignee: HEYHQ, INC., Yorba Linda, CA (US)

( * ) Notice: Subject to any disclaimer, the term of this patent is extended or adjusted under 35 U.S.C. 154(b) by 14 days.

(21) Appl. No.: 17/196,493

(22) Filed: Mar. 9, 2021

(65) Prior Publication Data
US 2021/0282226 A1   Sep. 9, 2021

Related U.S. Application Data

(60) Provisional application No. 62/987,327, filed on Mar. 9, 2020.

(51) Int. Cl.
*H04W 4/00*        (2018.01)
*H04W 84/18*       (2009.01)
(Continued)

(52) U.S. Cl.
CPC ............ *H04W 84/18* (2013.01); *G06F 9/541* (2013.01); *G06F 16/9017* (2019.01); *H04W 4/021* (2013.01); *H04W 64/003* (2013.01)

(58) Field of Classification Search
CPC ... H04W 84/18; H04W 4/021; H04W 64/003; G06F 16/9017; G06F 9/541
See application file for complete search history.

(56) References Cited

U.S. PATENT DOCUMENTS

| | | | | |
|---|---|---|---|---|
| 11,012,466 | B2* | 5/2021 | Gilmore | H04L 63/1441 |
| 2013/0027227 | A1* | 1/2013 | Nordstrom | G01C 21/3438 340/990 |
| 2014/0297409 | A1* | 10/2014 | Puckett | G06Q 30/0259 705/14.57 |

* cited by examiner

*Primary Examiner* — Justin Y Lee
(74) *Attorney, Agent, or Firm* — Lazaris IP

(57) ABSTRACT

A geo-coordinate management framework administers an assignment of geo-coordinates of hardware devices with a known location located within a geo-spatial operating environment of an organizational messaging and risk management software system to enable cooperation between disparate systems and such hardware devices with a known location for responses to events occurring within such a geo-spatial operating environment. The geo-coordinate management framework retrieves sets of geo-coordinates representing locations of hardware devices with a known location in response to the event, wherein the set of geo-coordinates are either embedded within an application programming interface call issued following an event or stored in a look-up table that is cross-referenced in response to the application programming interface call following an event. Such a framework triggers actions based on the geo-coordinates to operate the associated hardware devices in response to the event. Further, the geo-coordinate management framework also updates the set of geo-coordinates assigned to hardware devices by auditing the hardware devices to account for changes in their location due to being moved or replaced, as well as auditing an environment covered by the organizational messaging and risk management software system to capture geo-coordinates of newly-installed hardware devices.

30 Claims, 3 Drawing Sheets

(51) Int. Cl.
*H04W 64/00* (2009.01)
*G06F 9/54* (2006.01)
*G06F 16/901* (2019.01)
*H04W 4/021* (2018.01)

ASSIGNMENT AND UPDATING OF GEO-COORDINATES FOR HARDWARE WITH KNOWN LOCATIONS IN ACCESS CONTROL, OPERATIONS, AND NODE VALIDATION IN ORGANIZATIONAL COMMUNICATIONS AND RISK MANAGEMENT SYSTEMS

CROSS-REFERENCE TO RELATED PATENT APPLICATION(S)

This patent application claims priority to U.S. provisional application 62/987,327, filed on Mar. 9, 2020, the contents of which are incorporated in their entirety herein. In accordance with 37 C.F.R. § 1.76, a claim of priority is included in an Application Data Sheet filed concurrently herewith.

FIELD OF THE INVENTION

The present invention relates to geo-spatial operating environments and systems that are part of broader systems such as organizational communications and risk management systems. Specifically, the present invention relates to systems and methods for assigning coordinates to devices to ascertain the device's physical location, validate a state of one or more fixed and mobile nodes based on the physical location, and enable triggering actions within disparate systems based on configured proximity thresholds and event relays.

BACKGROUND OF THE INVENTION

Organizations are continuously faced with challenges in developing systems in which hardware devices having a known location can be integrated with communication methods such as messaging, alerting or commands provided by external systems (and the ability of internal systems to handle such information). Cooperation between such systems and hardware devices having a known location is crucial for appropriately and quickly responding to events affecting members, such as for example where a need arises to make informed decisions and/or to take urgent action, such as for example in public emergency or safety situations.

There are many hardware devices that have known positions in and around sites of interest to organization, such as in or around office buildings, warehouses, parking lots, etc. These devices, which include for example door locks, cameras, marquees, strobes, public announcement systems, etc., collectively play a role in security or administration of people and property. Often these sites (or the devices themselves) are in disparate systems and typically there is no interaction between these disparate systems and devices, nor with any unified concept of positioning that is utilized for automatically triggering appropriate actions. Currently, there is no existing approach to integrating these disparate systems, or the devices, within a broader organizational communication system that includes elements of a geo-spatial operating system, for triggering actions based on for example device proximity or device importance. Neither is there an existing approach which provides for integrating external systems with such devices for improvements in conveying and responding to alerts, commands, messages, or other urgent issues, nor is there an existing approach that allows for determining locations of such devices to update systems where devices have been moved, replacement devices installed, etc.

Accordingly, there is a need in the existing art for improvements at least in these aspects of integrating various systems within organizational communications systems and other operational management software systems that incorporate geo-spatial operating environments.

SUMMARY OF THE INVENTION

The present invention is a software framework for improving cooperation within organizational communications and risk management systems, by realizing improvements in inter-system operability between disparate components of such systems following occurrence of an event, which automatically triggers actions in hardware devices with a known location based on the proximity of those devices to that event. The software framework accomplishes this by assigning geo-coordinates to hardware devices with a known location and maintaining such devices in a valid state as part of nodes within such systems, in order to relay events between those devices based on a configured proximity threshold, and trigger the configured action accordingly. Additionally, the software framework may update assigned geo-coordinates to each hardware device with a known location by auditing the geo-coordinates of devices to account for, for example, relocation of a known device where the revised geo-coordinates have not been provided. The software framework may also audit the geo-spatial operating environment within which it is configured to capture geo-coordinates of newly-installed hardware devices. In this manner, the software framework operates to ascertain physical locations of the hardware devices and validate a state of fixed and static nodes comprising such devices.

The software framework may therefore be considered, in one embodiment of the present invention, as a process for assigning geo-coordinates for hardware devices and improving cooperation between disparate systems (both inter-system and intra-system cooperation). It may also be considered as a process for enhancing operability between one or more cloud-based servers, and management portals and mobile users via applications resident on their smart computing devices (all of which are internal systems of an organizational risk management system), and with such internal systems and external systems that serve as extensions of the organizational risk management system. The software framework's ability to integrate assignment and update of geo-coordinates for hardware devices with a known location is integral to the ability to trigger actions based on configured proximity thresholds and event relays, and to the resultant ability respond to events in a quick and efficient manner in an environment of such disparate systems.

The software framework may further be considered, in another embodiment of the present invention, as a method of maintaining hardware devices having known locations in a valid state by, as noted above, ascertaining the physical locations of the hardware devices, and auditing the geospatial operating environment within which such devices are configured to capture geo-coordinates of newly-installed hardware devices and update geo-coordinates of hard devices that have been moved or adjusted. The software framework may therefore be applied to validate one or more nodes within such an operating environment that comprise such hardware devices.

In one aspect of the present invention, the software framework is operable within a broader organizational risk management system that provides a structured messaging system as a private, secure, and auditable means of coordination between an organization and individual, or groups, of its mobile users. In another aspect of the present invention, the software framework is operable within a duty of care service for organizations or for risk management companies that provides integrated, pre- and post-loss risk management for mitigating physical and operational risks as well as liability losses. Such a service, which may be referred to herein as "InSite" herein, provides risk assessment and mitigation that combines, in one embodiment thereof, the Internet of Things (IoT) with and Internet of Persons™ (IoP) within a geo-spatial operating environment to deliver a risk management service for organizations in a private, secure, and auditable means of coordination between an organization and its stakeholders.

Regardless, it is one objective of the present invention to provide systems and methods for assigning geo-coordinates to hardware devices with a known location within an organizational software system that comprises one or more geospatial operating environments. It is another objective of the present invention to provide systems and methods that enable internal and external systems within such an organizational software system to quickly and appropriately respond to triggering events, by implementing a framework for assigning geo-coordinates to hardware devices with a known location. It is a further objective of the present invention to provide systems and methods that enable improvements in cooperation and inter-system operability between disparate components of organizational software systems, such as where one or more external systems serving as extensions of internal systems communicate with users and provide instructions that internal systems must respond to and which involve operation of hardware devices with a known location. It is still a further objective of the present invention to provide a framework within organizational software systems for updating geo-coordinates in such systems where fixed hardware devices have been moved, replacement devices installed, etc. It is yet another objective of the present invention to provide systems and methods of maintaining hardware devices having known locations in a valid state, and validate one or more nodes within a geo-spatial operating environment that comprise such hardware devices.

Other objectives, embodiments, features, and advantages of the present invention will become apparent from the following description of the embodiments, taken together with the accompanying drawings, which illustrate, by way of example, the principles of the invention.

BRIEF DESCRIPTION OF THE SEVERAL VIEWS OF THE DRAWINGS

The accompanying drawings, which are incorporated in and constitute a part of this specification, illustrate several embodiments of the invention and together with the description, serve to explain the principles of the invention.

DETAILED DESCRIPTION OF THE EMBODIMENT(S) OF THE INVENTION

Figure 1:
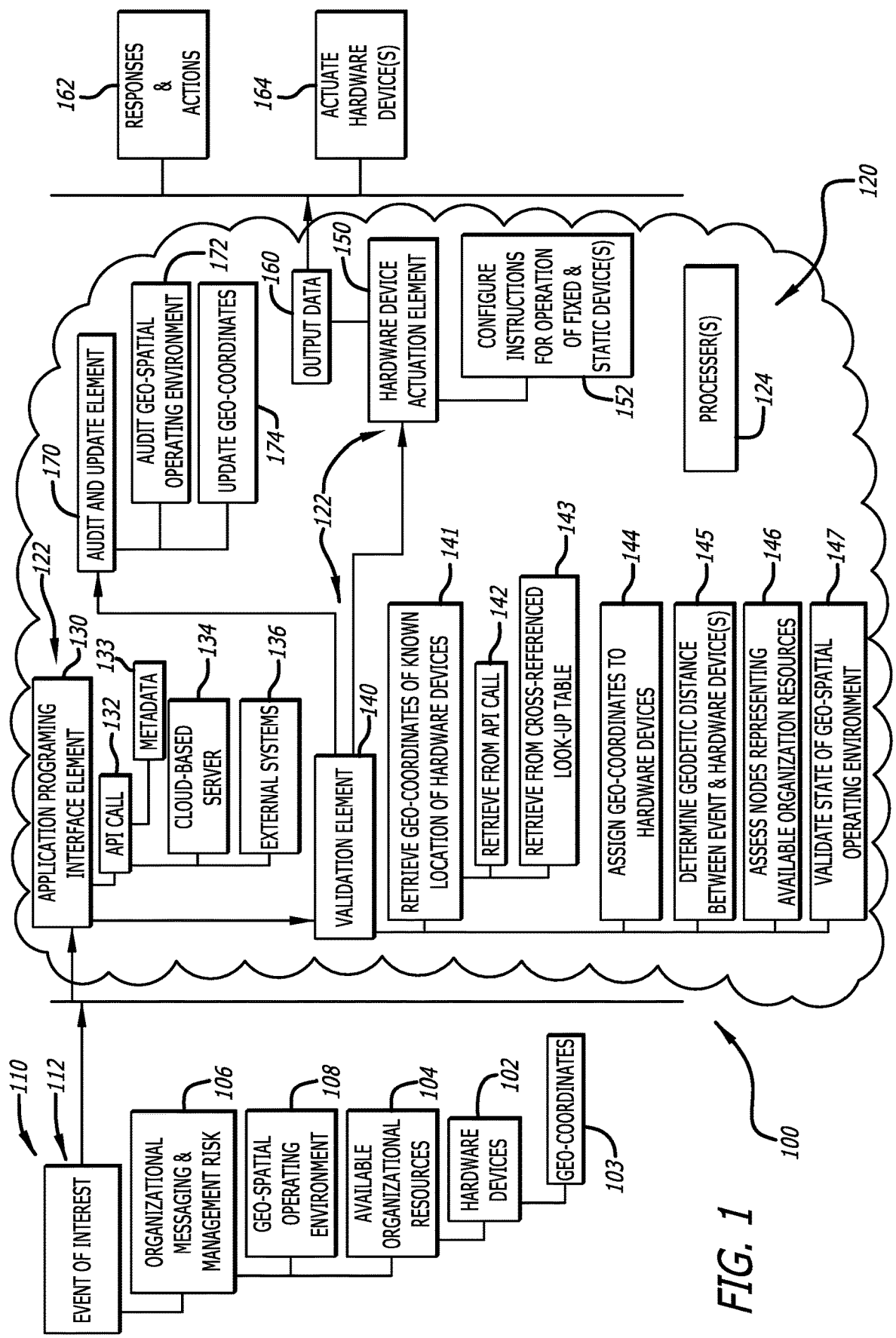
FIG. 1 is a systemic diagram illustrating elements of a geo-coordinate management framework according to the present invention.

In the following description of the present invention reference is made to the exemplary embodiments illustrating the principles of the present invention and how it is practiced. Other embodiments will be utilized to practice the present invention and structural and functional changes will be made thereto without departing from the scope of the present invention.

The present invention is a geo-coordinate management framework 100 for hardware devices 102 with a known location within a geospatial operating environment 108, for improving cooperation and communication within broader systems such as organizational messaging and risk management software systems 106, such as where customers utilize the broader system on a software-as-a-subscription or platform-as-a-service basis. The geo-coordinate management framework 100 is operable, in one embodiment of the present invention, based on an event (or events) 112 which automatically triggers actions in one or more hardware devices 102 with a known location, based on the proximity of those hardware devices 102 to that event. Within broader systems in which such a framework 100 is implemented, such as organizational messaging and risk management software systems 106, identification and integration of hardware devices 102 such as door locks, cameras, marquees, strobes, public announcement systems, etc. and that have known positions in and around sites of interest is integral to accurately and quickly responding when such actions are triggered. Assignment and tracking of geo-coordinates 103 to all such devices 102 for coordination in relaying information and carrying out actions involving those devices 102 is therefore an essential component to proper operation in such systems.

The geo-coordinate management framework 100 is also operable, in another embodiment of the present invention, within a geo-spatial operating environment 108 to track hardware devices 102 having known locations and ensure that such devices 102 are in a valid state, to validate nodes within such a geo-spatial operating environment 108 that are comprised of such devices 102, where the nodes are fixed, static or mobile. This may be accomplished by ascertaining physical locations of the hardware devices 102, and auditing the geo-spatial operating environment 108 within which such devices 102 are configured, for example to assign geo-coordinates 103 of newly-installed hardware devices 102 and update geo-coordinates 103 of hardware devices 102 that have been moved or adjusted. In this manner, the integrity of the geo-spatial operating environment 108 remains valid so that the broader systems in which the framework 100 is configured are capable of accurately and quickly responding when actions responsive to the occurrence of events 112 are triggered.

Geo-coordinates, such as for example Global Positioning System (GPS) coordinates, are a set of data points representing a latitude and a longitude of a point on the Earth's surface. Geo-coordinates typically indicate a physical location and may be provided by a satellite-driven navigational system. Regardless, it is to be understood that geo-coordinates are positional coordinates that identify a physical location on Earth, and that the present invention is not to be limited to any specific type of positioning system that generates such coordinates.

Geo-coordinates 103 in the present invention provide a protocol for associating hardware devices with a known location within a positioning system, but many, if not most, of such devices with a known location do not provide the capability to store geo-coordinates within the device itself, nor within the system that manages the device. Those that do provide this capability often do not do so in a manner that is consistent across the wide disparity of devices and systems which must integrate actions involving them or between within such broader organizational management systems. These include, as noted throughout, external systems that are integrated within internal systems and which provide alerts, commands, messages, instructions, and other information, as well as receiving information from those internal systems. The geo-coordinate management framework 100 of the present invention is therefore an approach to assignment and knowledge of such geo-coordinates for hardware devices, and passing information about such devices between the broader software architecture for organizational software and external systems. This may be accomplished in several different ways, as discussed below.

FIG. 1

FIG. 1 shows a systemic diagram of a geo-coordinate management framework 100 according to the present invention, for enabling the assignment and tracking of hardware devices 102, and validating the state of a geo-spatial operating environment 108 comprised of nodes that include such hardware devices 102, regardless of the broader system in which such a framework 100 is deployed. Such a geo-coordinate management framework 100 is configured to enable responses and actions following an event of interest 112 within a geo-spatial operating environment 108, which as noted above may be part of, in one embodiment of the present invention, an organizational messaging and risk management software system 106.

In the geo-coordinate management framework 100, input data 110 that identifies an event of interest 112 is received within a computing environment 120 that is comprised of a plurality of data processing elements 122 that are components within the geo-coordinate management framework 100, and which may include one or more processors 124 and a plurality of other software and hardware components configured to execute program instructions or routines stored within at least one computer-readable non-transitory storage medium to perform the functions that are embodied within the plurality of data processing elements 122 and described further herein. The geo-coordinate management framework 100 is performed as noted above within one or more systems and/or methods that include several components, each of which define distinct activities and functions for processing and responding to events of interest 112, and which are embodied within the data processing elements 122.

A geo-spatial operating environment 108 of a broader system, such as an organizational messaging and risk management software system 106, may include many different types of available organizational resources 104. Each of these may be located at disparate and different physical places within the geo-spatial operating environment 108, and may be either fixed, static or mobile. The available organizational resources 104 may include hardware devices 102 such as those described further herein, which may have geo-coordinates 103 identifying their position and physical location within the geo-spatial operating environment 108. However, these geo-coordinates 103 may change over time, due to a number of factors. Additionally, the broader collection of fixed, static, or mobile resources collectively represent a plurality of nodes within the geo-spatial operating environment 108. The geo-coordinate management framework 100 manages the assignment and updating of geo-coordinates 103 of at least the hardware devices 102, and also validates the collection of nodes representing the geo-spatial operating environment 108 to ensure that proper and timely responses and actions 162 to an occurrence of an events of interest 112 is effected.

The geo-coordinate management framework 100 ingests, receives, requests, or otherwise obtains input data 110 in the form of events of interest 112 that represent activities warranting a response or action 162 within a geo-spatial operating environment 108 of a broader system, such as an organizational messaging and risk management software system 106. Events of interest 112 may be any event which requires further allocation of resources to address an issue occurring within a specific geo-spatial operating environment 108, such as for example a distressed person, a report of an unauthorized individual present, a door that has been forced open, an alarm that has been activated, or unauthorized entry into a restricted area. It is to be understood that many types of events 112 requiring an allocation of resources are possible, and that such events 112 may differ widely based on the type of broader system in which the geo-spatial operating environment 108 is being monitored, and therefore the present invention is not to be limited to any one type of event of interest 112 that may be referenced or described herein.

The plurality of data processing elements 122 include an application programming interface element 130, which is configured to initiate an application programming interface (API) call 132 in response to an occurrence of an event of interest 112. The occurrence of event of interest 112 is initiated either from an internal cloud server 134 (in other words, within the organizational messaging and risk management software system 106 itself) or by an external system 136 configured to issue one or more alerts or commands to the organizational messaging and risk management software system 106 (for example, an external report or alarm following an earthquake), or receive notification of the event of interest 112 from the organizational messaging and risk management software system 106 (for example, a 'card access failed' notification, facial recognition notification, or report of an intruder with weapon communicated by a mobile user). Regardless of the initiation of the API call 132, the application programming interface element 130 acts a data ingest component that initializes further functions for responding to, or taking action in response to, an event of interest 112 occurring within the geo-spatial operating environment 108.

The plurality of data processing elements 122 also include a validation element 140, which is configured to ascertain a physical location of one or more of the hardware devices 102 that comprise the available organizational resources 104, within the geo-spatial operating environment 108 in which the event of interest 112 has occurred. The validation element 140 is configured to retrieve 141 geo-coordinates 103 of known, physical location of hardware devices 102 within the geo-spatial operating environment 108. This may be accomplished in one of two approaches.

In one such approach, the set of geo-coordinates 103 is embedded within a payload of metadata 133 within the API call 132 itself, and the geo-coordinate management framework 100 retrieves 142 the geo-coordinates by scanning the API call 132, identifying the geo-coordinates 103 of the desired hardware device 102 in the payload of metadata 133, and extracting the geo-coordinates 103 from the payload of metadata 133. One benefit of this approach is that neither the organizational messaging and risk management software system 106, nor any external system 136, has to store any specific geo-coordinates 103 for the hardware device 102, because that information is carried within metadata payload 133 in the configured API call 132.

In another approach, the set of geo-coordinates 103 is stored in a look-up table that is cross-referenced in response to the API call 132, and retrieved from such look-up table 143. Information that is indicative of the hardware device 102 in the look-up table may also be included within the payload of metadata 133. This can be performed internally, where the geo-coordinates 103 of the hardware devices 102 are mapped by the organizational messaging and risk management software system 106 in an internal database using a unique identifier for the hardware device 102 that is provided in the payload of metadata 133, against geo-coordinates 103 that are recorded in that internal database. The geo-coordinate management framework 100 ascertains the geo-coordinates 103 of that hardware device 102 by cross-referencing the relevant hardware device identifier accordingly. In such an internal mapping approach, external systems 136 do not need to have any notion of the geo-coordinate assignment of the hardware devices 102.

A variation on this approach involves mapping to an external cross-reference table. In this variation, an external system 136 incorporates geo-coordinates 103 into that external system's configuration and stores it therein. The geo-coordinates 103 are determined by the external system 136 cross-referencing its own look-up table, and the geo-coordinate management framework 100 retrieves 143 the geo-coordinates 103 following the occurrence of the event of interest 112. In this variation, the external system 136 may generalize its communication to the API of the organizational messaging and risk management software system 106 and pass on the geo-coordinates 103 controlled by the external system 136, again via the payload of metadata 133 contained in the API call 132.

These approaches to retrieving geo-coordinates of equipment such as hardware devices 102 are applicable regardless of whether devices 102 are configured to internally store geo-coordinates 103, and are particularly relevant where fixed and static equipment do not include the capability to store geo-coordinates 103 within the equipment itself. Additionally, systems that manage the equipment, regardless of whether the equipment is "dumb" or "smart", often also do not store position and location of the equipment, and those that do store this information this may not do so in a manner that is consistent across the disparity of devices and systems utilized within a software system. In other words, often these devices are utilized within disparate systems where there is typically no, or limited, interaction between these systems and devices, nor is there any unified concept of positioning that is utilized for the purposes of automatic triggering of responses and actions therein.

For example, where the geo-coordinate management framework 100 retrieves 142 the geo-coordinates by scanning the API call 132 as discussed above, a particular device 102 may have no coordinates per se, but is configured with a URL (Uniform Resource Locator) link to initiate an API call 132 when it detects smoke. Within such a URL are parameters that define coordinates which are treated by geo-coordinate management framework 100 in the same manner as if it were determined by a mobile GPS (Global Positioning System) or other similar system for identifying a physical position. Conversely, in the alternative approach above, the device 102 communicates an identifier when it detects smoke, and that identifier is used for cross-referencing in look-up table(s) to determine its position, where such a position is set in such look-up tables for each fixed device.

Regardless of the approach used, establishing the geo-coordinates 103 of devices 102 allows a broader software system in which the geo-spatial operating environment 108 is configured, such as the organizational messaging and risk management software system 106, to apply location-sensitive rules for responding to events of interest 112 when devices 102 interact with the geo-coordinate management framework 100.

The validation element 140 then assigns 144 the set of geo-coordinates 130 to the one or more hardware devices 102 within the geo-spatial operating environment 108. The geo-coordinate management framework 100 stores this information, for example in a database, and applies the set of geo-coordinates 103 to calculate a geodetic distance 145 between the event of interest 112 and hardware device(s) 102 within the geo-spatial operating environment 108, based on the set of geo-coordinates 103.

The geodetic, or geodesic, distance is the physical distance between two points, described by their latitude and longitude. The geodetic distance may be calculated 145 by determining two latitudes and two longitudes of relevant positional coordinates, and calculating the difference between those positional coordinates to approximate an actual, physical distance. For example, where the geo-coordinates of a device 102 are $(lat_n, lng_n)$ where $lat_n$ is the geodetic latitude of the $n^{th}$ device and $lng_n$ is the geodetic longitude of the $n^{th}$ device [expressed in radians], then the geodetic distance, between device 1 and device 2 is:

$$d = R_e \bullet Arccos(Sin(lat_1) \bullet Sin(lat_2) + Cos(lat_1) \bullet Cos(lat_2) \bullet Cos(lng_2 - lng_1))$$

where $R_e$ is the geodetic Earth radius and d is expressed in the same units as $R_e$. This geodetic distance can subsequently be utilized in conjunction with the known validity state of the device geo-locations by the geo-coordinate management framework 100 for implementing decisions within the geo-spatial operating environment 108.

The set of geo-coordinates 103 assigned to the one or more hardware devices 102 may be periodically updated in an auditing element 170 of the data processing elements 120. The auditing element 170 is configured to perform an audit 172 of hardware devices 102 within the geo-spatial operating environment 108, and update 174 the set of geo-coordinates 103. This may be advantageous, for example, where hardware devices 102 are re-located within the geo-spatial operating environment 108. Because the devices 102 themselves do not typically record or store their own geo-coordinates 103, the software system 106 in which the geo-spatial operating environment 108 is configured has no way of knowing the up-to-date, accurate positioning of all devices 102 therein.

The validation element 140 then performs an assessment of nodes 146 that represent the available organizational resources 104 with a pre-defined geodetic distance of the event of interest 112 that are within the geo-spatial operating environment 108. This assessment of nodes 146 is used to conduct a state validation 147 of the geo-spatial operating environment 108, to complete the process of ascertaining the physical location(s) of the hardware device(s) 102 that comprise the available organizational resources 104.

The geo-coordinate management framework 100 may also include an actuation element 150 which is configured to actuate the hardware device(s) 102 in response to an event of interest 112. The actuation element 150 prepares instructions 152 for the operation of fixed and static equipment among the available organizational resources 104 and within the geo-spatial operating environment 108. These instructions 152 represent, at least in part, output data 160 of the geo-coordinate management framework 100. Such instructions 152 may take many forms, but it is to be understood that instructions 152 are signals that when communicated to hardware devices 102, initiate operation of such devices 102 to perform specific functions.

Output data 160 may be utilized in the geo-coordinate management framework 100 to configure responsive behavior following the occurrence of an event of interest 112. The instructions 152 that form at least part of an output datastream from the geo-coordinate management framework 100 configure responses and actions 162 that may include actuating 164 hardware devices 102. The output data 160 therefore triggers activity to address an event of interest 112 based on the geo-coordinates 103 of the hardware devices 102.

FIG. 2

Figure 2:
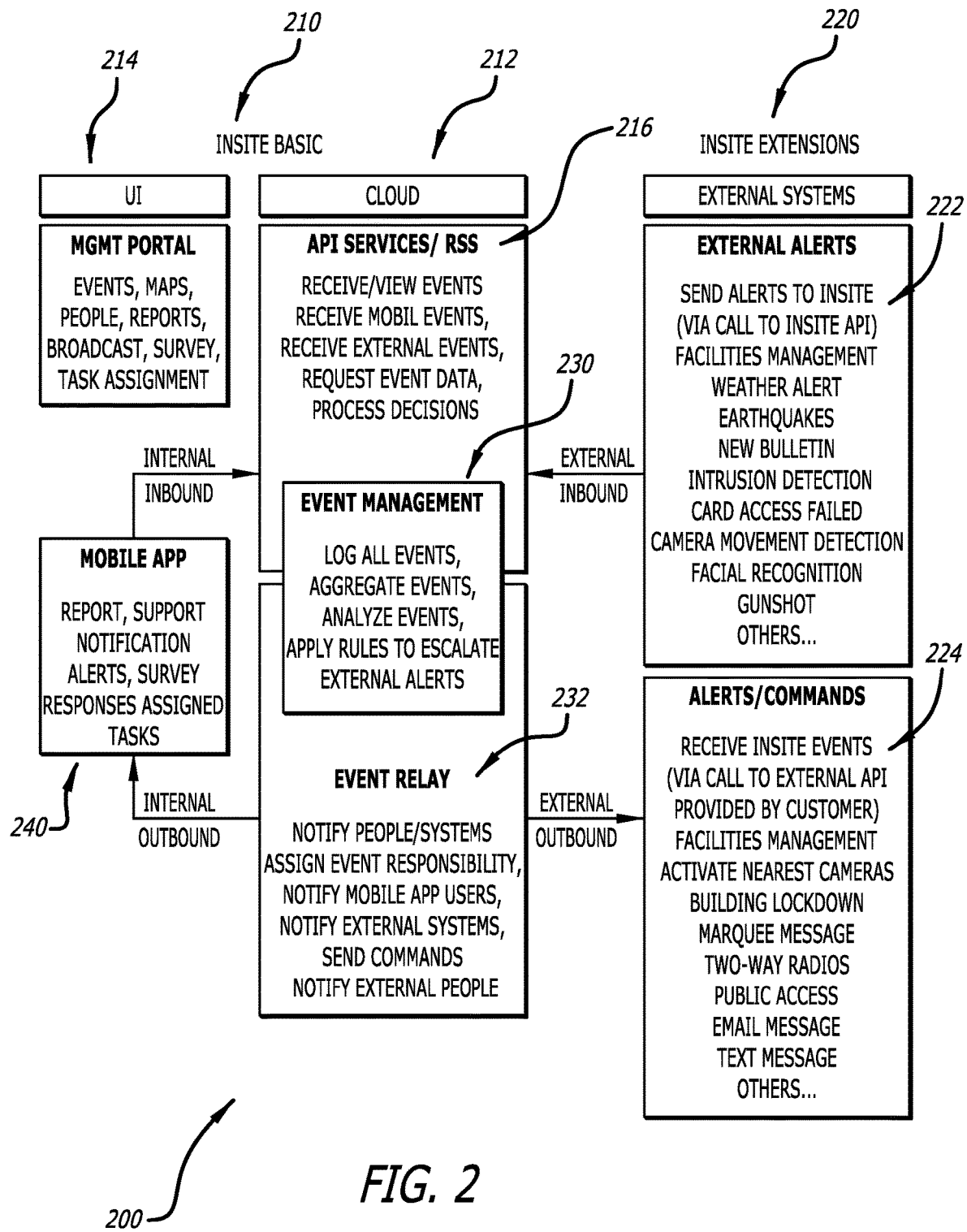
FIG. 2 is an entity relationship diagram for the geo-coordinate management framework according to one aspect of the present invention.

FIG. 2 below is an exemplary diagram providing an architectural overview and technical information for a software system, such as an organizational messaging and risk management software system 106, in which the present invention may be implemented. FIG. 2 illustrates the interaction between internal aspects of an organizational messaging and risk management software system 106 comprising the geo-coordinate management framework 100 for hardware devices 102 with a known location, and external systems 136 that send alerts, commands, messages, or instructions, or receive information related to events, or both.

As noted in FIG. 2, a basic configuration 200 in which the geo-coordinate management framework 100 for ascertaining a position of hardware devices 102 with a known location, and assigning geo-coordinates 103 thereto, is implemented includes a set of internal elements 210, and extensions 220 that represent external systems 136. The internal elements 210 of an organizational messaging and risk management software system 106 include a user interface portion 214, comprised of a management portal and mobile applications 240. The management portal allows users to perform and access a number of functions, such as define and report events, create and access maps, list and account for people within the organization, prepare reports, issue a broadcast survey, create and assign tasks, and many others. The management portal communicates with a cloud-based server 212 (or servers) which manages API services 216, such as for example receiving mobile events and external events, requesting event data, and processing decisions made. The cloud-based server element 212 of the configuration 200 also performs event management functions 230 (such as for example logging all events, aggregating events, analyzing events, and applying rules to escalate external alerts), and performs event relay functions 232 such as for example notifying people and systems of events and actions, assigning event responsibility, notifying users and external systems, communicating commands, etc. Users of the mobile application 240 are able to interact with functions of the cloud-based server 212 and report events, as well as receive support notification alerts, respond to surveys, and receive and respond to assigned tasks.

FIG. 2 also shows extensions 220 as noted above that are outside of such an organizational messaging and risk management software system 106 and geo-coordinate management framework 100, and represent the external systems 136 discussed herein. These extensions 220 enable external alerts 222, which may be sent to the organizational messaging and risk management software system 106 and the cloud-based server(s) 212 thereof via, as noted above, API calls 132. Examples of these external alerts 222 relate to facilities management issues, weather events, environmental events such as earthquakes, news bulletins, etc. Other external alerts 222 may be created based on systemic internal events that are detected externally, such as intrusion detection, failed card access attempt, camera detection of movement, facial recognition (positive for someone who does not belong, or a failed recognition attempt), reports of gunfire or an active shooter, and many others.

The extensions 220 also enable alerts and commands 224 that are issued based on event information, such as the occurrence of an event of interest 112, received from internal systems 210 via, for example, an event relay 232. Such alerts and commands 224 are responses and actions 162 that are triggered by output data 160 from the geo-coordinate management framework 100. Alerts and commands 224 include responses and actions 162 such as actuating hardware devices 102, for example activating a particular or nearest camera, initiating a building lockdown, displaying a marquee message, enabling two-way radio communication, providing a public address, and sending an email or text message.

EXEMPLARY IMPLEMENTATIONS

The following examples of how implementations of the geo-coordinate management framework 100 for hardware devices 102 with a known location may be used in actual situations where improvements inter-system operability may be realized are provided below. Specific references are made to the InSite system, but it is to be understood that they are also applicable in any organizational software system, such as the organizational messaging and risk management software system 106 referenced specifically herein, where the geo-coordinate management framework 100 of the present invention has been implemented.

Example 1

Distressed Person in Parking Lot

A person walking to their car late at night senses danger and uses an InSite mobile application within which the geo-coordinate management framework 100 for hardware devices 102 with a known location is implemented to request help. The InSite mobile application triggers a notification to security personnel on their mobile phone applications and management portals, as well as relays the help request to a number of external hardware devices 102. The relayed message from InSite carries a payload of metadata about the event 112, including the distressed person's location as geo-coordinates 103. The geo-coordinate management framework for hardware devices 102 with a known location causes the nearest cameras within range of the person to automatically become active on the screens being observed by security personnel. Furthermore, the geo-coordinate management framework 100 enables actions such as causing the nearest floodlights to be turned on, as well as all warning lights within a half mile radius.

In this scenario the event 112 is activated by the person in distress using a mobile application within InSite, and all subsequent systems are triggered by the configuration of an event relay from the internal systems.

Example 2

Door Is Forced Open

A warehouse door is forced open, and an InSite access control system receives a signal concerning the event 112.

The InSite access control system is configured to call an API 132 with details about the door and the event 112. The present invention cross-references the door information against its internal database to determine the geo-coordinates 103 for that door, and then relays the event 112 to the nearest security personnel (based on their position of their mobile devices). Note that the event may also be relayed to other disparate systems based on the proximity of the forced door to hardware devices 102 relative to those other disparate systems.

In this scenario the event is activated by an access control system's door lock, which sends the event notification for further processing and relays based on configured proximity thresholds.

Example 3

Smoke Detector Activated

A fire starts within an office building, and a nearby smoke detector sounds an alarm. Since the smoke detectors are typically simple, stand-alone units, each smoke detector is configured to call an API 132, with the geo-coordinates 103 of the smoke detector embedded in the API call 132. When an implemented system such as InSite receives the alert, it is able to determine the location of the fire based on those geo-coordinates 103 within the API call 132. InSite proceeds to notify the nearest security personnel, as well as relay the event to all employees at the affected office building based on their location when they checked in using their InSite mobile application.

In this scenario, the event is activated by a simple hardware device (the smoke detector) and despite its simplistic configuration that does not allow for any geo-coordinate positioning information, the geo-coordinate management framework 100 is able to embed this information in the configured API call 132 to the organizational messaging and risk management software system 106.

Example 4

Request Entry to Restricted Area

A person wishes to enter a building and requires special access, and they request entry using their InSite mobile application. Rather than the normal badge-to-door, or even phone-to-door approach, the InSite mobile application sends the request to a cloud server and checks the proximity of the mobile user to the entryway. InSite may either deny access based on its configured threshold proximity, or pass on the request for the access control to resolve. The InSite system may notify security personnel regarding this request and, as an added feature, an "actionable form" may be presented on that security personnel's mobile device providing them with an opportunity to manually override access within their InSite application.

In this scenario the InSite system works in tandem with the access control system to verify entry, using the location of the mobile device and without the need for any NFC (near-field communication) or other direct device in proximity to the door.

Figure 3:
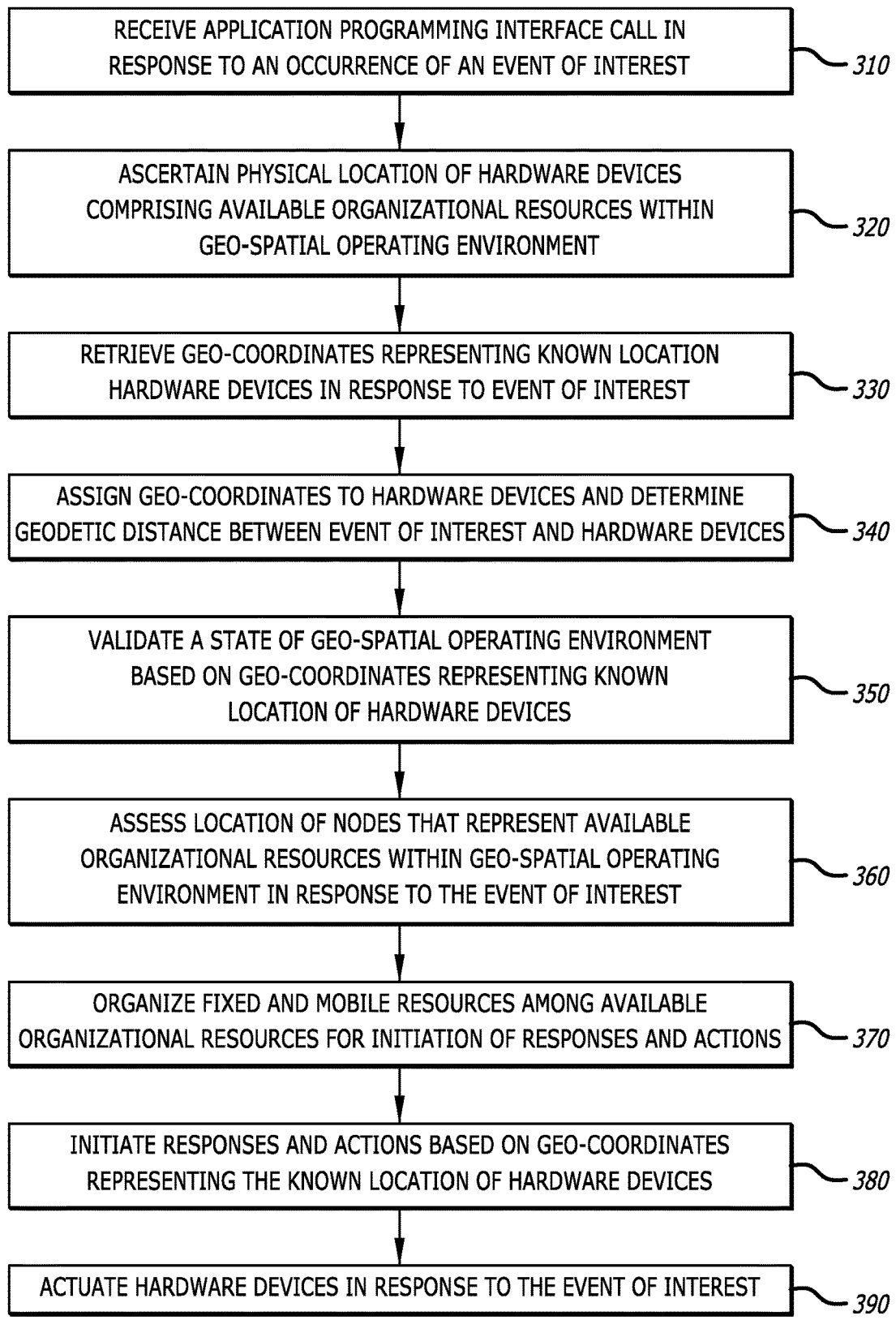
FIG. 3 is a flowchart of steps in a process of performing the geo-coordinate management framework according to one embodiment of the present invention.

FIG. 3 is a flowchart illustrating steps in a process 300 for performing the geo-coordinate management framework 100, according to one or more embodiments of the present invention. Such a process 300 may include one or more functions, mathematical models, algorithms, machine learning processes, and data processing techniques for the data processing elements 122 within such a framework 100, and for the various functions of each element 122, for ascertaining and assigning geo-coordinates 103 of hardware devices 102 within a geo-spatial operating environment 108, and for validating elements of the geo-spatial operating environment 108 for accurately and appropriately triggering responses and actions 162 following the occurrence of an event of interest 112.

The process 300 is initialized at step 310 by receiving an application programming interface call 132, in response to an occurrence of an event of interest 112. The process 300 uses the information contained in a payload of metadata 133 within the API call 132 to ascertain, at step 320, a physical location of hardware devices 102 within the geo-spatial operating environment 108. At step 330, this is accomplished by retrieving the set of geo-coordinates 103, from either extracting the geo-coordinates 103 from the payload of metadata 133 contained in the API call 132 itself, or by extracting a unique identifier for the desired hardware device 102 from the metadata 133 and using this information to cross-reference one or more look-up tables containing geo-coordinates 103 for different hardware devices 102. Regardless of the approach used, the process 300 then assigns the set of geo-coordinates 103 to the hardware device 102 to identify its physical location, and determines the geodetic distance between hardware device 102 and the event of interest using the geo-coordinates 103, within the geo-spatial operating environment 108, at step 340.

The process 300 then proceeds with validating a state of the geo-spatial operating environment 108, as part of an overall responsive system within the geo-coordinate management framework 100 that addresses the occurrence of events of interest 112, at step 350. This validation step is based on the set of geo-coordinates 103 representing the known location of hardware devices 102, and involves assessing the location of nodes that represent all available organizational resources 104 within the geo-spatial operating environment 108 at step 360. Such nodes may include, as noted above, fixed/static and mobile nodes, all of which may be relevant when formulating a response or action 162 to the event of interest 112. This assessment is used to organize fixed and mobile resources among the available organizational resources 104, at step 370.

The process 300 then initiates responses and actions 162 based on the geo-coordinates 103 representing the hardware devices 102 within the geo-spatial operating environment 108 at step 380. At step 390, the process 300 actuates hardware devices 102 to execute the instructions indicative of responses and actions 162 at least in part, in response to the event of interest 112.

The systems and methods of the present invention may be implemented in computing environments 120 having many different variations, and in many different types of software systems. For example, the various algorithms embodied in the data processing elements 122 may be implemented in conjunction with a special purpose computer, a programmed microprocessor or microcontroller and peripheral integrated circuit element(s), an ASIC or other integrated circuit, a digital signal processor, electronic or logic circuitry such as discrete element circuit, a programmable logic device or gate array such as a PLD, PLA, FPGA, PAL, GPU and any comparable means. Still further, the present invention may be implemented in cloud-based data processing environments, and where one or more types of servers are used to process large amounts of data, and using processing components such as CPUs, GPUs, TPUs, and other similar hardware. In general, any means of implementing the methodology illustrated herein can be used to implement the various aspects of the present invention. Exemplary hardware that can be used for the present invention includes computers, handheld devices, telephones (e.g., cellular, Internet enabled, digital, analog, hybrids, and others), and other such hardware. Some of these devices include processors (e.g., a single or multiple microprocessors or general processing units), memory, nonvolatile storage, input devices, and output devices. Furthermore, alternative software implementations including, but not limited to, distributed processing, parallel processing, or virtual machine processing can also be configured to perform the methods described herein.

The systems and methods of the present invention may also be wholly or partially implemented in software that can be stored on a non-transitory computer-readable storage medium, executed on programmed general-purpose computer with the cooperation of a controller and memory, a special purpose computer, a microprocessor, or the like. In these instances, the systems and methods of this invention can be implemented as a program embedded on a mobile device or personal computer through such mediums as an applet, JAVA® or CGI script, as a resource residing on one or more servers or computer workstations, as a routine embedded in a dedicated measurement system, system component, or the like. The system can also be implemented by physically incorporating the system and/or method into a software and/or hardware system.

Additionally, the data processing functions disclosed herein may be performed by one or more program instructions stored in or executed by such memory, and further may be performed by one or more modules configured to carry out those program instructions. Modules are intended to refer to any known or later developed hardware, software, firmware, machine learning, artificial intelligence, fuzzy logic, expert system or combination of hardware and software that is capable of performing the data processing functionality described herein.

The foregoing descriptions of embodiments of the present invention have been presented for the purposes of illustration and description. It is not intended to be exhaustive or to limit the invention to the precise forms disclosed. Accordingly, many alterations, modifications and variations are possible in light of the above teachings, may be made by those having ordinary skill in the art without departing from the spirit and scope of the invention. It is therefore intended that the scope of the invention be limited not by this detailed description. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

The invention claimed is:

1. A method, comprising:

receiving, within an organizational messaging and risk management software system having a geo-spatial operating environment, an application programming interface call in response to an occurrence of an event of interest that is initiated by either an internal cloud server or an external system configured to issue one or more alerts or commands to the organizational messaging and risk management software system or receive notification of the event of interest from the organizational messaging and risk management software system;

ascertaining a physical location of one or more hardware devices comprising available organizational resources within the geo-spatial operating environment, by retrieving a set of geo-coordinates representing a known location of one or more hardware devices in response to the event of interest, wherein the set of geo-coordinates are either embedded within and retrieved from the application programming interface call or stored in and retrieved from a look-up table that is cross-referenced in response to the application programming interface call;

assigning the set of geo-coordinates to the one or more hardware devices within the geo-spatial operating environment;

determining a geodetic distance between the event of interest and the one or more hardware devices using the set of geo-coordinates;

validating a state of the geo-spatial operating environment based on the set of the geo-coordinates representing the known location of the one or more hardware devices, by assessing the location of nodes comprised of at least one of fixed nodes, static nodes, and mobile nodes that together represent available organizational resources within the geo-spatial operating environment in response to the event of interest, to organize the available organizational resources for initiation of one or more responses and actions to the event of interest based on the geodetic distance between the event of interest and the one or more hardware devices, and the available organizational resources within the geo-spatial operating environment represented by the nodes; and triggering the one or more responses and actions based on the set of geo-coordinates representing the known location of the one or more hardware devices to actuate the one or more hardware devices in response to the event of interest.

2. The method of claim 1, further comprising auditing the geo-spatial operating environment of the organizational messaging and risk management software system to capture geo-coordinates of newly-installed hardware devices.

3. The method of claim 1, further comprising updating the set of geo-coordinates assigned to the at least one hardware device by periodically auditing the at least one hardware device.

4. The method of claim 1, wherein the application programming interface call includes a payload that is comprised at least in part of metadata that includes the set of geo-coordinates for each hardware device.

5. The method of claim 1, wherein the at least one hardware device is one or more of a door lock, a camera, a message marquee, a strobe light, and a public announcement system.

6. The method of claim 1, wherein the mobile nodes represent one or more of people and devices associated with people within the geo-spatial operating environment.

7. The method of claim 1, wherein the one or more responses and actions include activating lighting within a pre-defined geodetic distance of the event of interest.

8. The method of claim 1, wherein the one or more responses and actions include orienting video resources within a pre-defined geodetic distance to capture and record the event of interest.

9. The method of claim 1, wherein the one or more responses and actions include notification of personnel to respond to the geo-location of the event of interest.

10. The method of claim 1, wherein the one or more responses and actions include alerting of individuals within a pre-defined geodetic distance of the event of interest.

11. A method of responding to an event of interested within a geo-spatial operating environment, comprising:

obtaining a set of geo-coordinates representing a known location of one or more hardware, initiated by an application programming interface call in response to an occurrence of an event of interest commenced by either an internal cloud server or an external system configured to issue one or more alerts or commands to an organizational messaging and risk management software system or receive notification of the event from the organizational messaging and risk management software system, to ascertain a physical location of the one or more hardware devices within the geo-spatial operating system, wherein the set of geo-coordinates are either embedded within and retrieved from the application programming interface call or stored in and retrieved from a look-up table that is cross-referenced in response to the application programming interface call;

assigning the set of geo-coordinates to the one or more hardware devices within the geo-spatial operating environment; and identifying available organizational resources within the geo-spatial operating environment, by determining a geodetic distance between the event of interest and the one or more hardware devices within the geo-spatial operating environment based on the assigned geo-coordinates, and validating a state of the geo-spatial operating environment based on the set of the geo-coordinates representing the known location of the one or more hardware devices, the one or more nodes comprised of at least one of fixed nodes, static nodes, and mobile nodes that together represent the available organizational resources within the operating environment, to actuate the one or more hardware devices and perform one or more responses and actions to the event of interest.

12. The method of claim 11, further comprising auditing the geo-spatial operating environment of the organizational messaging and risk management software system to capture geo-coordinates of newly-installed hardware devices.

13. The method of claim 11, further comprising updating the set of geo-coordinates assigned to the at least one hardware device by periodically auditing the at least one hardware device.

14. The method of claim 11, wherein the application programming interface call includes a payload that is comprised at least in part of metadata that includes the set of geo-coordinates for each hardware device.

15. The method of claim 11, wherein the at least one hardware device is one or more of a door lock, a camera, a message marquee, a strobe light, and a public announcement system.

16. The method of claim 11, wherein the mobile nodes represent one or more of people and devices associated with people within the geo-spatial operating environment.

17. The method of claim 11, wherein the one or more responses and actions include activating lighting within a pre-defined geodetic distance of the event of interest.

18. The method of claim 11, wherein the one or more responses and actions include orienting video resources within a pre-defined geodetic distance to capture and record the event of interest.

19. The method of claim 11, wherein the one or more responses and actions include notification of personnel to respond to the geo-location of the event of interest.

20. The method of claim 11, wherein the one or more responses and actions include alerting of individuals within a pre-defined geodetic distance of the event of interest.

21. A system, comprising:

within an organizational messaging and risk management software system having a geospatial operating environment, an application programming interface element configured to receive an application programming interface call in response to an occurrence of an event of interest that is initiated by either an internal cloud server or an external system configured to issue one or more alerts or commands to the organizational messaging and risk management software system, or to receive notification of the event of interest from the organizational messaging and risk management software system;

a geo-spatial operating environment validation element, configured to:

ascertain a physical location of one or more hardware devices comprising available organizational resources within the geo-spatial operating environment, by retrieving a set of geo-coordinates representing a known location of one or more hardware devices in response to the event of interest, wherein the set of geo-coordinates are either embedded within and retrieved from the application programming interface call or stored in and retrieved from a look-up table that is cross-referenced in response to the application programming interface call, assign the set of geo-coordinates to the one or more hardware devices within the geo-spatial operating system, determine a geodetic distance between the event of interest and the one or more hardware devices based on the assigned set of geo-coordinates, and validate a state of the geo-spatial operating environment based on the set of the geo-coordinates representing the known location of the one or more hardware devices, by assessing the location of nodes comprised of at least one of fixed nodes, static nodes, and mobile nodes that together represent available organizational resources within the geo-spatial operating environment in response to the event of interest, to organize both the available organizational resources for initiation of one or more responses and actions to the event of interest based on the geodetic distance between the event of interest and the one or more hardware devices, and the available organizational resources within the geo-spatial operating environment represented by the nodes; and a device actuation element, configured to trigger the one or more responses and actions based on the set of geo-coordinates representing the known location of one or more hardware devices, by actuating the one or more hardware devices in response to the event of interest.

22. The system of claim 21, wherein the geo-spatial operating environment validation element is further configured to audit the geo-spatial operating environment of the organizational messaging and risk management software system to capture geo-coordinates of newly-installed hardware devices.

23. The system of claim 21, further comprising updating the set of geo-coordinates assigned to the one or more hardware devices by periodically auditing the at least one hardware device.

24. The system of claim 21, wherein the application programming interface call includes a payload that is comprised at least in part of metadata that includes the set of geo-coordinates for each hardware device.

25. The system of claim 21, wherein the at least one hardware device is one or more of a door lock, a camera, a message marquee, a strobe light, and a public announcement system.

26. The system of claim 21, wherein the mobile nodes represent one or more of people and devices associated with people within the geo-spatial operating environment.

27. The method of claim 21, wherein the one or more responses and actions include activating lighting within a pre-defined geodetic distance of the event of interest.

28. The system of claim 21, wherein the one or more responses and actions include orienting video resources within a pre-defined geodetic distance to capture and record the event of interest.

29. The system of claim 21, wherein the one or more responses and actions include notification of personnel to respond to the geo-location of the event of interest.

30. The system of claim 21, wherein the one or more responses and actions include alerting of individuals within a pre-defined geodetic distance of the event of interest.

* * * * *